(12) United States Patent
Choi et al.

(10) Patent No.: US 8,896,926 B1
(45) Date of Patent: Nov. 25, 2014

(54) OPTICAL SYSTEM FOR HEAD-MOUNTED DISPLAY

(71) Applicant: Sekonix Co., Ltd., Gyeonggi-Do (KR)

(72) Inventors: Soon Chul Choi, Gyeonggi-Do (KR); Jung Hee Hwangbo, Gyeonggi-Do (KR)

(73) Assignee: Sekonix Co., Ltd., Dongducheon, Gyeonggi-Do (KR)

( * ) Notice: Subject to any disclaimer, the term of this patent is extended or adjusted under 35 U.S.C. 154(b) by 0 days.

(21) Appl. No.: 14/063,025

(22) Filed: Oct. 25, 2013

(30) Foreign Application Priority Data

Jun. 17, 2013 (KR) ........................ 10-2013-0069166

(51) Int. Cl.
*G02B 27/14* (2006.01)
*G02B 15/14* (2006.01)

(52) U.S. Cl.
USPC .......................................... 359/630; 359/392

(58) Field of Classification Search
USPC ......... 359/630–633, 691, 692, 717, 793, 795, 359/773
See application file for complete search history.

(56) References Cited

U.S. PATENT DOCUMENTS 7,764,442 B2 * 7/2010 Teraoka et al. ............... 359/773
8,094,387 B2 * 1/2012 Hsu et al. ..................... 359/795

FOREIGN PATENT DOCUMENTS

JP 07-043633 A 2/1995

* cited by examiner

*Primary Examiner* — Mohammed Hasan
(74) *Attorney, Agent, or Firm* — Edwards Wildman Palmer LLP; Kongsik Kim; Carolina E. Save

(57) ABSTRACT

An optical system for a head-mounted display in which image rays provided from a display device are divergent to form and provide an enlarged image is configured so that first and second lenses are sequentially disposed from an object along an optical axis and provide the enlarged image on an image plane, and angles of principal rays are gradually increased from the optical axis toward the edge of the image plane. Thus, as the angles of principal rays are increased, an angle of view is improved to provide a large screen so that it is possible to appreciate a vivid image due to an increase in the sense of presence and the degree of involvement. The entire size of the optical system can be reduced. The head-mounted display can be made compact and lightweight.

13 Claims, 5 Drawing Sheets

OPTICAL SYSTEM FOR HEAD-MOUNTED DISPLAY

CROSS-REFERENCE TO RELATED APPLICATION

This application claims priority to and the benefit of Korean Patent Application No. 10-2013-0069166 filed in the Korean Intellectual Property Office on Jun. 17, 2013, the entire contents of which are incorporated herein by reference.

BACKGROUND OF THE INVENTION

1. Field of the Invention

The present invention relates, in general, to a head-mounted display and, more particularly, to an optical system for a head-mounted display, in which lenses are arranged along an optical axis to allow angles of principal rays incident upon an image plane to be gradually increased, thereby increasing an angle of view, reducing a length of the optical system, and increasing the sense of presence and the degree of involvement 2. Description of the Related Art Generally, a head-mounted display (HMD) refers to a device that is worn on the head of a user, has an optical system embedded therein, and enables the user to enjoy large images in front of his or her eyes.

Particularly, the HMD is realized with both eyes of a user isolated from his or her surroundings, is provided therein with optical lenses, enables the user to enjoy images on a considerably wider screen than a real screen, and allows the degree of involvement, the sense of presence, and the degree of perception to be further increased.

The HMD has been provided in various shapes such as glasses, a helmet, and a cap. Recently, in consideration of a tendency toward popularization based on demands of consumers and technical development, in addition to portability and comfort, studies have been actively made of designs for small-sized, lightweight, and simple and elegant designs.

The basic principle of the HMD places an object within a focal length of a concave mirror so that an upright virtual image is enlarged and formed behind the concave mirror, and enables a user to recognize the enlarged virtual image so as to enjoy the enlarged images.

FIG. 1 schematically shows an optical system provided for a conventional head-mounted display.

As shown in FIG. 1, a liquid crystal display (LCD) on which an image input outside is displayed is located at one side, and incident light of the image is reflected on a half mirror, is incident on an concave mirror, so that a user can appreciate an upright virtual image enlarged behind the concave mirror.

The prior art using this principle is disclosed in Korean Patent Nos. 10-0304622 and 10-0272375, and Korean Unexamined Patent Application Publication No. 10-2005-0005823.

First, in the first technology (Korean Patent No. 10-0304622), an optical system for a head-mounted display in which an image produced from a display device is enlarged and formed by light irradiated by a light source and can be provided to a user, includes an imaging lens unit that has at least one lens formed of a high-refraction high-dispersion material and having strong negative power and at least one lens formed of a low-refraction low-dispersion material and having positive power and which condenses the image produced from the display device, a filter lens that has positive power and forms an incident image on a primary imaging plane along with the imaging lens unit, a half mirror that transmits or reflects incident light to change its path, and a reflective mirror on which light split and cast from the half mirror and which reflects the light toward the eyes of the user.

The second technology (Korean Patent No. 10-0272375) includes an optical image generating means of irradiating image information input from the outside, a reflecting and transmitting means of reflecting and transmitting an optical image from the optical image generating means, and a virtual image forming means of forming the optical image reflected by the reflecting and transmitting means into an upright virtual image and being asymmetrically installed at a position corresponding to the reflecting and transmitting means.

Finally, in the third technology (Korean Unexamined Patent Application Publication No. 10-2005-0005823), an optical system for a head-mounted display that enlarges image light output from a predetermined display device at a predetermined magnification and produces large images at positions adjacent to both eyes includes a spontaneously emitted single light emitting display device for outputting predetermined image light, an X-prism equalizing the image light output from the light emitting display device, a pair of relay lens systems that enlarge, converge, and transfer each image light split and refracted by a reflective plane of the X-prism at a predetermined magnification, and a pair of reflective mirrors that are disposed adjacent to the left and right eyes of a user at a predetermined reflective angle so as to be able to convert and reflect the image light enlarged and converged by each relay lens system toward the left and right eyes.

Each of the prior arts includes the optical system for the HMD that enlarges the image produced from the display device and provides the enlarged image to the user. The optical systems have the half mirror and the reflective mirror as the common components.

Fundamentally, the half mirror should be located at a focal point formed by the reflective mirror. If this structure is not provided, various imaging lens units and relay lens systems should be introduced, and the image of the display device should be located at or inside the focus of the reflective mirror.

That is, the light reflected by the half mirror is enlarged on the entire plane of the reflective mirror so that an upright virtual image is formed. This structure can be miniaturized when a small display device having a size of 25 mm or less is used. However, a small display device has a disadvantage in that it is expensive if its resolution is increased. When an inexpensive and low-resolution display device is used, there is a limit in that the size of the HMD can be no longer reduced.

This imposes restrictions on realizing portability or miniaturization and is problematic in realizing a reduction in weight. This weight causes fatigue when the user wears the HMD on the head for a long time.

Further, the optical system for the HMD having such a structure generally has an angle of view of about 30 to 50 degrees, and thus reduces enlarging capability and creates difficulty providing a large image having a predetermined magnification. This can be overcome by reducing the radius of curvature of the reflective mirror. However, to do so, the half mirror should be disposed adjacent to the reflective mirror. In this case, the light path is interrupted, and thus it is difficult to provide a large image having a predetermined magnification.

FIG. 2 schematically shows an optical system using a principle of a magnifier among the conventional optical systems for the HMD. This structure can realize a large image using a display device having a size of 30 mm or more without using a small display device. However, a lens has a larger size than the display device, and thus the system has a very large size and is increased in weight. Thus, there is a disadvantage in that it is inconvenient to wear the HMD.

SUMMARY OF THE INVENTION

Accordingly, the present invention has been made keeping in mind the above problems occurring in the related art, and the present invention is intended to propose an optical system for a head-mounted display, in which lenses are arranged along an optical axis to allow angles of principal rays incident upon an image plane to be gradually increased, thereby increasing an angle of view, reducing a size of the optical system so as to be easily worn, and increasing the sense of presence and the degree of involvement.

In order to achieve the above object, according to one aspect of the present invention, there is provided an optical system for a head-mounted display, in which image rays provided from a display device are divergent to provide an enlarged image. First and second lenses are sequentially disposed along an optical axis so as to allow angles of principal rays incident upon an image plane to be gradually increased from an optical axis toward an edge of the image plane. The first lens has positive refractive power, and the second lens has negative refractive power. $|R1/R2|>2.5$, and $|f1/f2|<0.6$, where R1 is a radius of curvature of a front surface of the first lens, R2 is a radius of curvature of a rear surface of the first lens, f1 is a focal length of the first lens, and f2 is a focal length of the second lens.

Here, the principal rays may be configured so that the angles thereof are gradually increased between 20% and 80% of a size of the image formed on the image plane.

Further, the second lens may satisfy a condition of $Tc/Te<0.7$, where Tc is a thickness in the middle of the second lens, and Te is a thickness at a position corresponding to 70% of an effective diameter of the second lens.

Also, the first and second lenses may be formed of different materials. The first and second lenses may be separately formed and have at least one aspheric surface.

According to the present invention, as the angles of principal rays are increased, the angle of view is improved to provide a large screen, and resolution is increased, so that it is possible to appreciate a vivid image due to an increase in the sense of presence and the degree of involvement.

Further, the optical system allows its entire size to be reduced while securing a predetermined angle of view. Thus, the head-mounted display can be made compact and lightweight. Accordingly, head-mounted displays of simple and elegant designs can be supplied according to demands of various consumers along with improvements in portability and comfort.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
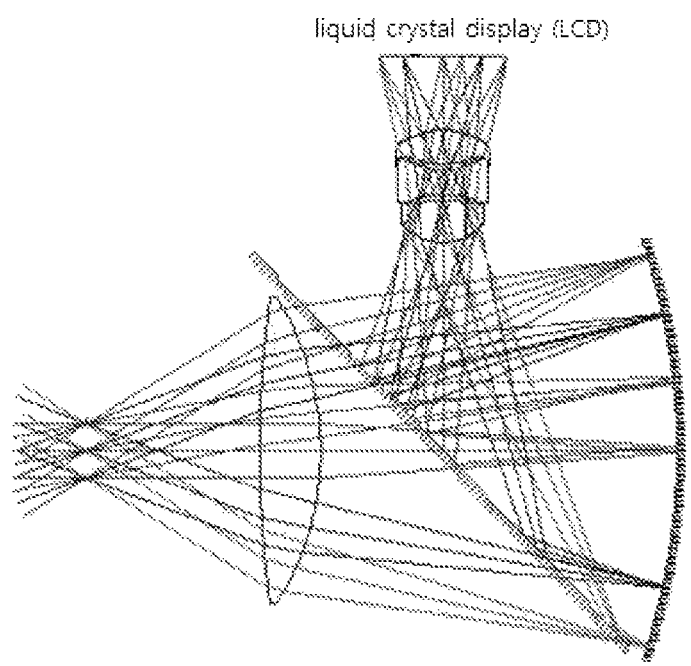
FIG. 1 schematically shows an optical system provided for a conventional head-mounted display (HMD)
Figure 2:
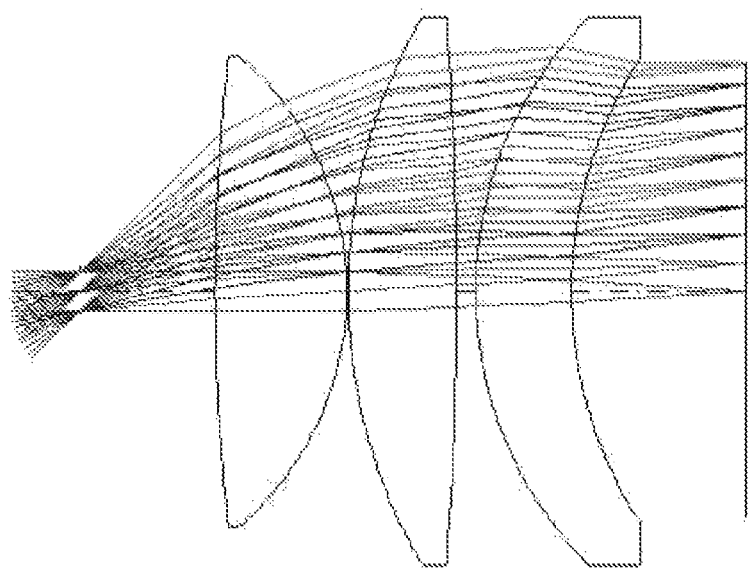
FIG. 2 schematically shows an optical system using a principle of a magnifier among the conventional optical systems for the HMD.

The present invention is directed to an optical system for a head-mounted display (HMD) worn on the head of a user, in which image rays provided from a display device are divergent to allow an enlarged image to be formed and provided to both eyes of the user, and in which first and second lenses are disposed from an object along an optical axis in that order and provide the enlarged image.

Reference will now be made in greater detail to exemplary embodiments of the invention with reference to the accompanying drawings.

The optical system for the HMD according to the present invention includes lenses enlarging a small image provided from the display device, and is basically designed so as to use the position of an eye as an entrance pupil and a position of the display device as an image plane.

That is, when the lens is viewed through the user's eye located at the entrance pupil, a virtual image is formed on the image plane behind the lens. A size of the virtual image formed on the image plane becomes the size of a screen actually recognized by the user.

To realize the optical system for the HMD according to the present invention in this way, the first and second lenses are disposed from the object along the optical axis in that order and provide the enlarged image. Angles of principal rays incident upon the image plane are gradually increased from the optical axis toward the edge of the image plane.

Here, the principal rays refer to rays passing through a stop. The last ray left in a process of reducing the stop is representative of a luminous flux. Aberrations such as astigmatism, a curvature of image field, distortion are obtained with respect to the principal rays. In the present invention, the angles of principal rays incident upon the image plane are gradually increased with the approach to the edge of the image plane.

The fact that the angles of principal rays are increased means that it is possible to reduce a total length of the optical system in which the lenses are included in the HMD and to increase an angle of view.

In general, when the angle of view is increased, the image can be enlarged at a high magnification. However, the image is subjected to severe distortion and a decrease in resolution, and the size of the optical system is increased.

However, when the optical system for the HMD according to the present invention is used, the angles of principal rays are increased to allow the principal rays to uniformly arrive up to the edge of the image plane. Thus, the angle of view can be increased, and the image can be enlarged at a high magnification. Nevertheless, an image a having high resolution and a large size is provided without severe distortion.

In this way, when the optical system for the HMD according to the present invention is used, the angle of view is equal to or greater than 70°. This provides only the enlarged image having the angle of view of 70° or more in a state in which a peripheral field of view is isolated, so that it is possible to realize a remarkable increase in the sense of presence and the degree of involvement.

Above all, the present invention is designed so that the angles of the principal rays are gradually increased within an area that occupies 20 to 80% of the size of the image formed on the image plane. In detail, since the angles of the principal rays are slightly increased within an area of 0 to 20%, the degree of distortion is weak. Since an area of 80% or more is an edge of the image plane, the distortion is not noticeably recognized although it is not corrected.

Meanwhile, a total of two lenses are used in the optical system for the HMD according to the present invention. That is, the first and second lenses are sequentially disposed from the object along the optical axis and provide the enlarged image.

Here, it is preferable that the first lens has positive refractive power, and the second lens has negative refractive power.

Further, a ratio of the radius of curvature R1 of a front surface of the first lens to the radius of curvature R2 of a rear surface of the first lens is preferably less than 2.5 (|R1/R2|<2.5), i.e., the radius of curvature R1 of the front surface of the first lens is preferably greater than the radius of curvature R2 of the rear surface of the first lens.

Further, a ratio of a focal length f1 of the first lens to a focal length f2 of the second lens is preferably less than 0.6 (|f1/f2|<0.6).

In addition, it is preferable that the first and second lenses are formed of different materials, are separately formed, and have at least one aspheric surface.

To correct the aberrations of the first lens, it is favorable that the ratio of the radius of curvature of the front surface to the radius of curvature of the rear surface is satisfied as described above. Further, to correct the aberrations, it is favorable that the second lens has weak negative refractive power and the first lens has strong positive refractive power. To do so, it is favorable that the ratio of the focal length of the first lens to the focal length of the second lens satisfies the aforementioned condition. The shape and material for the first and second lenses are conditions that minimize spherical aberrations such as coma aberration, a curvature of image field, and distortion aberration and chromatic aberration to enhance performance of the optical system and can reduce the entire size of the optical system.

Further, the second lens is designed to have weak negative refractive power in the middle thereof compared to the other portion and to have strong negative refractive power with the approach to the edge thereof, thereby gradually increasing the angles of the principal rays to reduce the length and the distortion aberration of the optical system. In this case, it is favorable that the second lens satisfies the condition that a ratio of a thickness Tc in the middle to a thickness Te at a position corresponding to 70% of an effective diameter is less than 0.6 (Tc/Te<0.6).

In this way, the optical system according to the present invention has the positive refractive power as a whole. To correct the aberrations, the first lens has the strong positive refractive power, and the second lens has the weak negative refractive power. Thereby, the angles of the principal rays are gradually increased to be able to provide the image of high magnification.

Hereinafter, exemplary embodiments of the present invention will be described.

First Embodiment

Figure 3:
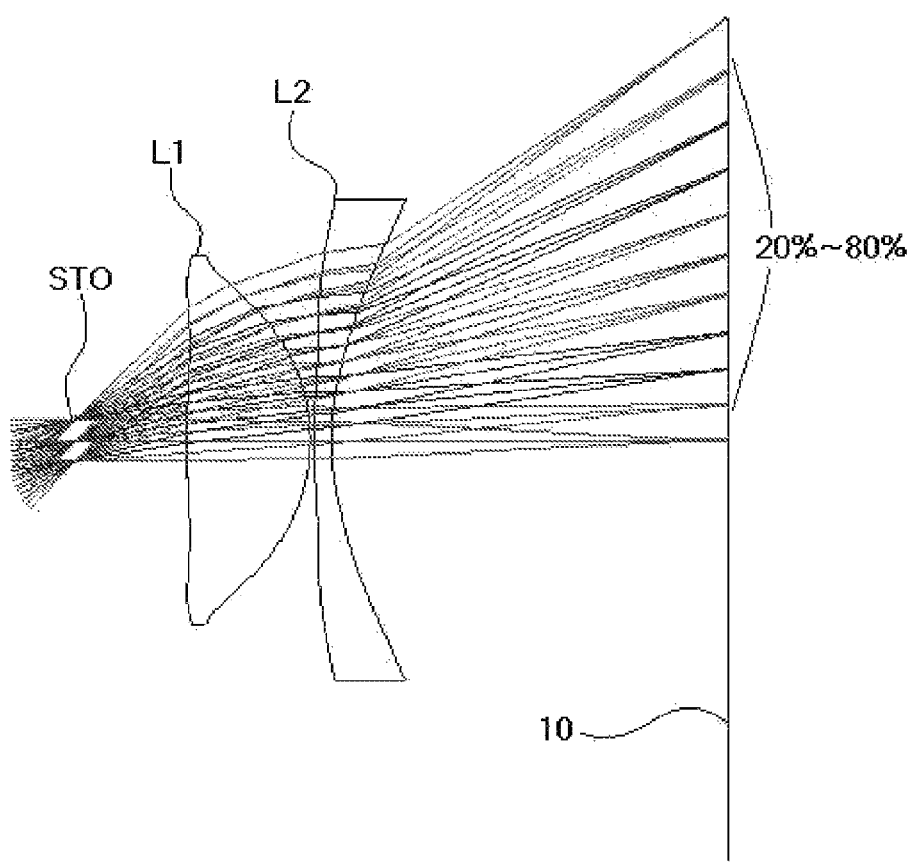
FIG. 3 shows an optical system for an HMD in accordance with a first embodiment of the present invention.

FIG. 3 shows an optical system for an HMD in accordance with a first embodiment of the present invention.

As shown, a first lens L1 and a second lens L2 are sequentially arranged from the object along an optical axis. Here, the object is a virtual object and refers to a distance from an enlarged image when a user directly recognizes the enlarged image.

Numerical data of the lenses constituting the optical system according to the first embodiment of the present invention are shown in Table 1 below.

TABLE 1

| Plane No. | Radius of curvature (RDY) | Thickness (THI) | Refractive index (Nd) | Abbe value (Vd) |
|---|---|---|---|---|
| OBJ | INFINITY | 2000 | | |
| STO | INFINITY | 11 | | |
| 2 | 71.481 | 12.31 | 1.531 | 55.8 |
| 3 | −18.674 | 0.43 | | |
| 4 | 56.509 | 1.70 | 1.585 | 30.0 |
| 5 | 25.087 | 39.57 | | |
| IMG | INFINITY | 0 | | |

(OBJ: Object plane, STO: Stop, IMG: Image plane, and Infinity: Flat plane)

As shown in FIG. 3, the stop STO is disposed at the side of the object, and the first lens L1 and the second lens L2 are disposed from the stop. When an optical axis direction is set as X, and a direction perpendicular to the optical axis is set as a Y axis, an aspheric formula is as follows:

Formula 1

$$X(Y) = \frac{Y^2}{R} \frac{1}{1 + \sqrt{1 - (1+K)\left(\frac{Y}{R}\right)^2}} + AY^4 + BY^6 + CY^8 + DY^{10} + EY^{12} + FY^{14}$$

An aspheric surface is a curved surface obtained by rotating a curve obtained by Formula 1 round the optical axis. In Formula 1, R is the radius of curvature, K is the conic constant, and A, B, C, D, E, and F are the aspheric coefficients.

The aspheric coefficients of Formula 1 which are derived from the data of the lenses are given as in Table 1 below.

TABLE 2

| | A | B | C | D | E | F |
|---|---|---|---|---|---|---|
| S2 | −3.67054E−05 | −7.44523E−08 | 6.48080E−10 | −1.99642E−12 | 7.69976E−15 | −1.16220E−17 |
| S3 | −5.95035E−07 | −1.16964E−07 | 7.58065E−10 | −4.54880E−13 | −7.51177E−15 | 2.53831E−17 |
| S4 | −7.12688E−05 | 2.59311E−07 | −3.31290E−10 | 5.71877E−14 | 4.44975E−17 | 9.77508E−20 |
| S5 | −4.93594E−05 | 1.32441E−07 | −2.09467E−10 | −8.78022E−14 | 5.54735E−16 | −5.15126E−19 |

The angle of view, the height of image, and the incident angle of the image plane 10 of the principal rays in the optical system having these lenses are shown in Table 3 below.

TABLE 3

| Angle of view (°) | Height of image (mm) | Angle of principal ray (°) |
|---|---|---|
| 0.0 | 0 | 0 |
| 4.5 | 3.48 | 3.20 |
| 9.0 | 7.02 | 6.10 |

TABLE 3-continued

| Angle of view (°) | Height of image (mm) | Angle of principal ray (°) |
|---|---|---|
| 13.5 | 10.68 | 8.43 |
| 18.0 | 14.48 | 10.02 |
| 22.5 | 18.43 | 10.91 |
| 27.0 | 22.55 | 11.39 |
| 31.5 | 26.90 | 12.07 |
| 36.0 | 31.58 | 13.92 |
| 40.5 | 36.70 | 18.13 |
| 45.0 | 42.00 | 25.61 |

As shown in Table 3, it can be found that the angles of the principal rays are gradually increased. In particular, it can be confirmed that there is a distinct phenomenon in which the angles of the principal rays are gradually increased between 20% and 80% with respect to the size of the image formed on the image plane 10, i.e. an overall image height of 42 mm. It is shown that the angle of view is about 45° (90° including the lower half of the optical axis).

In the present embodiment, the first lens has a focal length of 29.27 mm and strong positive refractive power, and the second lens has a focal length of −78.7 mm and weak negative refractive power. A ratio of the focal length f1 of the first lens to the focal length f2 of the second lens is 0.37 (|f1/f2|=0.37).

Further, in the first lens, a ratio of the radius of curvature R1 of the front surface to the radius of curvature R2 of the rear surface is 3.83 (|R1/R2|=3.83).

Also, in the second lens, a thickness Tc in the middle is 1.7 mm, and a thickness Te at a position corresponding to 70% of an effective diameter is 4.86 mm. A ratio of the thickness Tc to the thickness Te is 0.35 (Tc/Te=0.35).

In addition, the first and second lenses are formed of different materials, are separately formed, and have both aspheric surfaces.

In this way, due to the gradual increase of the angles of the principal rays, the angle of view is increased. Due to this effect, the optical system can be designed for its entire size of about 55 mm, and the HMD can be made compact and lightweight. Due to the increase of the angle of view, the sense of presence and the degree of involvement are increased.

Second Embodiment

Figure 4:
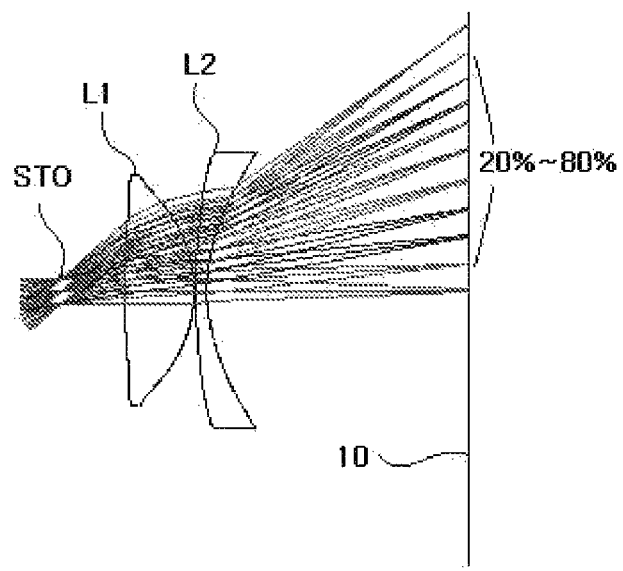
FIG. 4 shows an optical system for an HMD in accordance with a second embodiment of the present invention.

FIG. 4 shows an optical system for an HMD in accordance with a second embodiment of the present invention.

As shown, a first lens L1 and a second lens L2 are sequentially arranged from the object along an optical axis. Here, the object is a virtual object and refers to a distance from an enlarged image when a user directly recognizes the enlarged image.

Numerical data of the lenses constituting the optical system according to the second embodiment of the present invention are shown in Table 4 below.

TABLE 4

| Plane No. | Radius of curvature (RDY) | Thickness (THI) | Refractive index (Nd) | Abbe value (Vd) |
|---|---|---|---|---|
| OBJ | INFINITY | 2000 | | |
| STO | INFINITY | 10 | | |
| 2 | 67.054 | 11.18 | 1.531 | 55.8 |
| 3 | −20.675 | 0.20 | | |
| 4 | 49.507 | 1.80 | 1.585 | 30.0 |
| 5 | 22.834 | 41.82 | | |
| IMG | INFINITY | 0 | | |

(OBJ: Object plane, STO: Stop, IMG: Image plane, and Infinity: Flat plane)

As shown in FIG. 4, the stop STO is disposed at the side of the object, and the first lens L1 and the second lens L2 are disposed from the stop. When an optical axis direction is set as X, and a direction perpendicular to the optical axis is set as a Y axis, an aspheric formula is given as in Formula 1.

The aspheric coefficients of Formula 1 which are derived from the data of the lenses are given as in Table 5 below.

TABLE 5

| | A | B | C | D | E | F |
|---|---|---|---|---|---|---|
| S2 | 3.40429E−06 | −3.02420E−07 | 1.27810E−09 | −1.97775E−12 | 2.03720E−15 | −1.90049E−18 |
| S3 | 1.25201E−05 | −1.14165E−07 | 2.61400E−10 | 8.26441E−13 | −4.31929E−15 | 9.49326E−18 |
| S4 | −6.41851E−05 | 2.41461E−07 | −1.85031E−10 | −2.75073E−13 | −6.61195E−16 | 1.92626E−18 |
| S5 | −6.50926E−05 | 2.63434E−07 | −5.30520E−10 | −5.75878E−14 | 1.02349E−15 | −8.43238E−19 |

The angle of view, the height of image, and the incident angle of the image plane 10 of the principal rays in the optical system having these lenses are shown in Table 6 below.

TABLE 6

| Angle of view (°) | Height of image (mm) | Angle of principal ray (°) |
|---|---|---|
| 0 | 0.00 | 0.00 |
| 5 | 4.18 | 1.03 |
| 10 | 8.42 | 2.06 |
| 15 | 12.79 | 3.11 |
| 20 | 17.34 | 4.27 |
| 25 | 22.14 | 5.65 |
| 29 | 26.24 | 6.99 |
| 32 | 29.54 | 8.16 |
| 35 | 33.13 | 9.45 |
| 38 | 37.10 | 10.81 |
| 41 | 41.60 | 12.11 |

As shown in Table 6, it can be found that the angles of the principal rays are gradually increased. In particular, it can be confirmed that there is a distinct phenomenon in which the angles of the principal rays are gradually increased between 20% and 80% with respect to the size of the image formed on the image plane 10, i.e. an overall image height of 41.6 mm. It is shown that the angle of view is about 42° (84° including the lower half of the optical axis).

In the present embodiment, the first lens has a focal length of 31.14 mm and strong positive refractive power, and the second lens has a focal length of 74.3 mm and weak negative refractive power. A ratio of the focal length f1 of the first lens to the focal length f2 of the second lens is 0.42 (|f1/f2|=0.42).

Further, in the first lens, the ratio of the radius of curvature R1 of the front surface to the radius of curvature R2 of the rear surface is 3.24 (|R1/R2|=3.24).

Also, in the second lens, a thickness Tc in the middle is 1.8 mm, and a thickness Te at a position corresponding to 70% of an effective diameter is 4.32 mm. A ratio of the thickness Tc to the thickness Te is 0.42 (Tc/Te=0.42).

In addition, the first and second lenses are formed of different materials, are separately formed, and have both aspheric surfaces.

In this way, due to the gradual increase of the angles of the principal rays, the angle of view is increased. Due to this effect, the optical system can be designed with an entire size of about 55 mm, and thus the HMD can be made compact and lightweight. Due to the increase of the angle of view, the sense of presence and the degree of involvement are increased.

Third Embodiment

Figure 5:
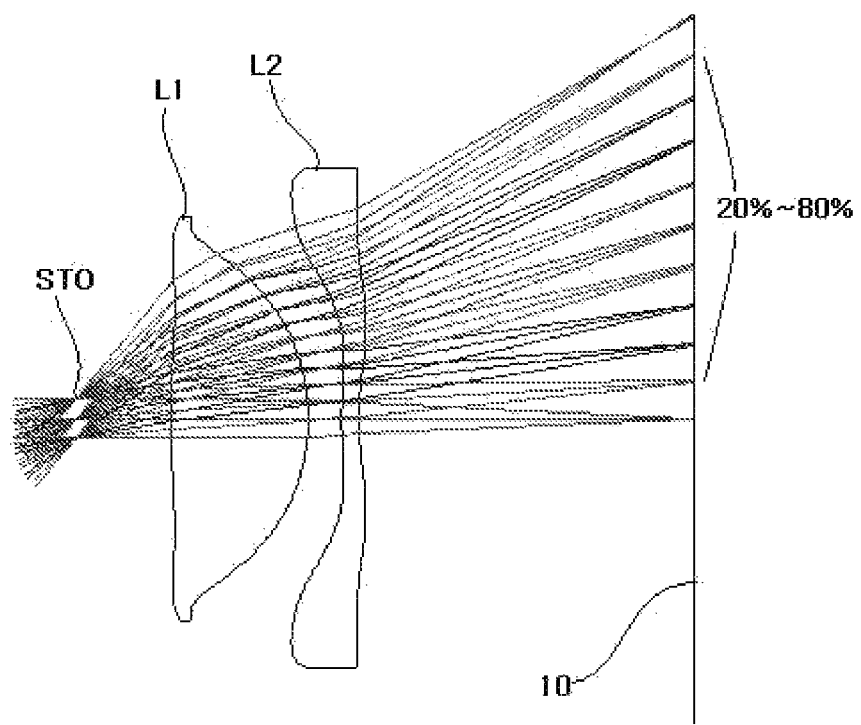
FIG. 5 shows an optical system for an HMD in accordance with a third embodiment of the present invention.

FIG. 5 shows an optical system for an HMD in accordance with a third embodiment of the present invention.

As shown, a first lens L1 and a second lens L2 are sequentially arranged from the object along an optical axis. Here, the object is a virtual object and refers to a distance from an enlarged image when a user directly recognizes the enlarged image.

Numerical data of the lenses constituting the optical system according to the third embodiment of the present invention are shown in Table 7 below.

TABLE 7

| Plane No. | Radius of curvature (RDY) | Thickness (THI) | Refractive index (Nd) | Abbe value (Vd) |
|---|---|---|---|---|
| OBJ | INFINITY | 2000 | | |
| STO | INFINITY | 10 | | |
| 2 | 117.595 | 14.41 | 1.531 | 55.8 |
| 3 | −20.644 | 3.50 | | |
| 4 | 42.921 | 1.80 | 1.585 | 30 |
| 5 | 26.606 | 35.29 | | |
| IMG | INFINITY | 0 | | |

(OBJ: Object plane, STO: Stop, IMG: Image plane, and Infinity: Flat plane)

As shown in FIG. 5, the stop STO is disposed at the side of the object, and the first lens L1 and the second lens L2 are disposed from the stop. When an optical axis direction is set as X, and a direction perpendicular to the optical axis is set as a Y axis, an aspheric formula is given as in Formula 1.

The aspheric coefficients of Formula 1 which are derived from the data of the lenses are given as in Table 8 below.

TABLE 8

| | A | B | C | D | E | F |
|---|---|---|---|---|---|---|
| S2 | 6.22821E−06 | −2.20830E−07 | 8.95590E−10 | −1.94639E−12 | 2.94488E−15 | −1.90379E−18 |
| S3 | 4.29981E−06 | −1.04861E−07 | 1.87839E−10 | 8.21400E−13 | −4.96590E−15 | 9.82459E−18 |
| S4 | −1.73387E−04 | 3.29816E−07 | −6.26003E−12 | −1.13393E−13 | −8.12726E−16 | 9.25148E−19 |
| S5 | −1.61271E−04 | 4.51185E−07 | −5.28657E−10 | −1.57306E−13 | 9.41390E−16 | −6.79097E−19 |

The angle of view, the height of image, and the incident angle of the image plane 10 of the principal rays in the optical system having these lenses are shown in Table 9 below.

TABLE 9

| Angle of view (°) | Height of image (mm) | Angle of principal ray (°) |
|---|---|---|
| 0 | 0 | 0 |
| 5 | 3.81 | 1.48 |
| 10 | 7.70 | 2.98 |
| 15 | 11.72 | 4.55 |
| 20 | 15.87 | 6.34 |
| 25 | 20.12 | 8.47 |
| 30 | 24.43 | 11.06 |
| 35 | 28.82 | 14.06 |
| 40 | 33.31 | 17.24 |
| 45 | 37.83 | 20.07 |
| 50 | 42.00 | 21.36 |

As shown in Table 9, it can be found that the angles of the principal rays are gradually increased. In particular, it can be confirmed that there is a distinct phenomenon in which the angles of the principal rays are gradually increased between 20% and 80% with respect to the size of the image formed on the image plane 10, i.e. an overall image height of 42 mm. It is shown that the angle of view is about 50° (100° including the lower half of the optical axis).

In the present embodiment, the first lens has a focal length of 34.31 mm and strong positive refractive power, and the second lens has a focal length of 124.74 mm and weak negative refractive power. The ratio of the focal length f1 of the first lens to the focal length f2 of the second lens is 0.28 (|f1/f2|=0.28).

Further, in the first lens, the ratio of the radius of curvature R1 of the front surface to the radius of curvature R2 of the rear surface is 5.7 (|R1/R2|=5.7).

Also, in the second lens, the thickness Tc in the middle is 1.8 mm, and the thickness Te at a position corresponding to 70% of an effective diameter is 5.69 mm. The ratio of the thickness Tc to the thickness Te is 0.32 (Tc/Te=0.32).

In addition, the first and second lenses are formed of different materials, are separately formed, and have both aspheric surfaces.

In this way, due to the gradual increase of the angles of the principal rays, the angle of view is increased. Due to this effect, the optical system can be designed with an entire size of about 55 mm, and the HMD can be made compact and lightweight. Due to the increase of the angle of view, the sense of presence and the degree of involvement are increased.

When the optical system for the HMD realized by each embodiment of the present invention is used, the angle of view can be realized up to about 110° due to the increase of the angles of the principal rays. A large screen of 130 inches or more can be realized at a virtual distance of about 2 meters, and thus a vivid image can be appreciated due to the increase of the sense of presence and the degree of involvement.

Further, the entire size of the optical system can be realized while being equal to or less than 60 mm while securing a predetermined angle of view. Thus, the HMD can be made compact and lightweight. Accordingly, an HMD of simple and elegant designs can be supplied according to demands of various consumers along with the improvement of portability and comfort.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An optical system for a head-mounted display, in which image rays provided from a display device are divergent to provide an enlarged image, wherein
   first and second lenses are sequentially disposed along an optical axis so as to allow angles of principal rays incident upon an image plane to be gradually increased from an optical axis toward an edge of the image plane,
   the first lens has positive refractive power, and the second lens has negative refractive power, $|R1/R2|>2.5$, and $|f1/f2|<0.6$, where R1 is a radius of curvature of a front surface of the first lens, R2 is a radius of curvature of a rear surface of the first lens, f1 is a focal length of the first lens, and f2 is a focal length of the second lens.

2. The optical system according to claim 1, wherein the principal rays are configured so that the angles thereof are gradually increased between 20% and 80% of a size of the image formed on the image plane.

3. The optical system according to claim 1, wherein the second lens satisfies a condition of Tc/Te<0.7, where Tc is a thickness in the middle of the second lens, and Te is a thickness at a position corresponding to 70% of an effective diameter of the second lens.

4. The optical system according to claim 1, wherein the first and second lenses are formed of different materials.

5. The optical system according to claim 4, wherein one of the first and second lenses is formed of plastic.

6. The optical system according to claim 1, wherein the first and second lenses are separately formed and have at least one aspheric surface.

7. The optical system according to any one of claims 1 to 6, wherein the optical system has an angle of view of 65° or more.

8. An optical system for a head-mounted display, in which image rays provided from a display device are divergent to provide an enlarged image, wherein
   first and second lenses are sequentially disposed along an optical axis so as to allow angles of principal rays incident upon an image plane to be gradually increased from an optical axis toward an edge of the image plane between 20% and 80% of a size of the image formed on the image plane,
   the first lens has positive refractive power, and the second lens has negative refractive power, $|R1/R2|>2.5$, and $|f1/f2|<0.6$, where R1 is a radius of curvature of a front surface of the first lens, R2 is a radius of curvature of a rear surface of the first lens, f1 is a focal length of the first lens, and f2 is a focal length of the second lens.

9. The optical system according to claim 8, wherein the second lens satisfies a condition of Tc/Te<0.7, where Tc is a thickness in the middle of the second lens, and Te is a thickness at a position corresponding to 70% of an effective diameter of the second lens.

10. The optical system according to claim 8, wherein the first and second lenses are formed of different materials.

11. The optical system according to claim 10, wherein one of the first and second lenses is formed of plastic.

12. The optical system according to claim 8, wherein the first and second lenses are separately formed and have at least one aspheric surface.

13. The optical system according to any one of claims 8 to 12, wherein the optical system has an angle of view of 65° or more.

* * * * *